United States Patent
Tang et al.

(10) Patent No.: US 9,758,624 B2
(45) Date of Patent: Sep. 12, 2017

(54) INORGANIC PASSIVATION MATERIAL, METHOD FOR FORMING THE SAME, AND INORGANIC PASSIVATION PROTECTIVE FILM PRODUCED THEREFROM

(71) Applicant: INDUSTRIAL TECHNOLOGY RESEARCH INSTITUTE, Hsinchu (TW)

(72) Inventors: Wei-Cheng Tang, Hsinchu (TW); Yun-Shan Huang, Zhunan Township (TW); Ya-Tin Yu, New Taipei (TW); Yi-Che Su, Zhubei (TW); Yuung-Ching Sheen, Zhubei (TW); Yuan-Chang Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 433 days.

(21) Appl. No.: 14/305,354

(22) Filed: Jun. 16, 2014

(65) Prior Publication Data

US 2015/0183936 A1  Jul. 2, 2015

(30) Foreign Application Priority Data

Dec. 31, 2013 (TW) .............................. 102149211 A

(51) Int. Cl.
*B05D 3/00* (2006.01)
*C08G 77/395* (2006.01)
(Continued)

(52) U.S. Cl.
CPC .......... *C08G 77/395* (2013.01); *C09D 183/04* (2013.01); *C09D 183/06* (2013.01); *C09D 183/08* (2013.01); *C08G 77/30* (2013.01)

(58) Field of Classification Search
CPC .................................................. C08G 77/395
See application file for complete search history.

(56) References Cited

U.S. PATENT DOCUMENTS 6,210,749 B1    4/2001    Bremmer et al.
6,379,804 B1    4/2002    Ackerman et al.
(Continued)

FOREIGN PATENT DOCUMENTS

CN    101250699 A    8/2008
CN    101675133 A    3/2010
(Continued)

OTHER PUBLICATIONS

Lamaka et al ("Novel hybrid sol-gel coatings for corrosion protection of AZ31 B magnesium alloys" in Electrochimica Acta 53 (2008) 4773-4783.*
(Continued)

*Primary Examiner* — Nathan Empie
(74) *Attorney, Agent, or Firm* — Birch, Stewart, Kolasch & Birch, LLP

(57) ABSTRACT

A method for forming an inorganic passivation material is provided. The method includes mixing about 5 to 80 parts by weight of trialkoxysilane, about 10 to 80 parts by weight of tetraalkoxysilane, and about 1 to 30 parts by weight of catalyst to perform a reaction at pH of about 0.05 to 4 to form an inorganic resin material. The inorganic resin material is modified by phosphate ester to form an inorganic passivation material, wherein phosphate ester is about 0.1-10 parts by weight based on 100 parts by weight of the inorganic resin material. An inorganic passivation material and a passivation protective film produced therefrom are also provided.

8 Claims, 2 Drawing Sheets

(51) Int. Cl.
*C09D 183/04* (2006.01)
*C09D 183/06* (2006.01)
*C09D 183/08* (2006.01)
*C08G 77/30* (2006.01)

(56) References Cited

U.S. PATENT DOCUMENTS

| | | | |
|---|---|---|---|
| 2005/0158566 A1* | 7/2005 | Higuchi | C08G 77/06 428/447 |
| 2006/0029811 A1* | 2/2006 | Sugioka | C08L 63/00 428/413 |
| 2006/0228470 A1 | 10/2006 | He et al. | |
| 2007/0090329 A1 | 4/2007 | Su et al. | |
| 2012/0108703 A1* | 5/2012 | Tamura | C09D 163/00 523/435 |
| 2013/0139930 A1 | 6/2013 | Wagh et al. | |
| 2013/0281592 A1 | 10/2013 | Kamizono et al. | |

FOREIGN PATENT DOCUMENTS

| | | |
|---|---|---|
| CN | 102409325 A | 4/2012 |
| CN | 102533108 A | 7/2012 |
| CN | 102719129 A | 10/2012 |
| CN | 102898946 A | 1/2013 |
| TW | 200700580 | 1/2007 |
| TW | 200706362 A | 2/2007 |
| TW | 200804541 A | 1/2008 |
| TW | 200913767 A | 3/2009 |
| TW | I395385 B | 5/2013 |
| WO | 97/11035 A1 | 3/1997 |

OTHER PUBLICATIONS

Chen, "High Molecular-Weight Synthetic Materials Science (I)," Chemical Industrial Press, Jan. 31, 2005, with an English translation, pp. 260-261.

Chinese Office Action and Search Report for Chinese Application No. 201410045557.7, dated Aug. 26, 2016.

Díaz et al., "Corrosion resistance of new epoxy-siloxane hybrid coatings. A laboratory study," Progress in Organic Coatings, vol. 69, 2010, pp. 278-286.

El Aal et al, "Galvanostatic study of the breakdown of Zn passivity by sulphate anions," Corrosion Science, vol. 51, 2009 (Available online May 13, 2009), pp. 1780-1788.

Li et al., "Corrosion performance of epoxy coatings modified by nanoparticulate $SiO_2$," Materials and Corrosion, vol. 63, No. 1, 2012, pp. 44-53.

Pepe et al., "Cerium hybrid silica coatings on stainless steel AISI 304 substrate," The Journal of Sol-Gel Science and Technology, vol. 39, 2006 (Published online: Jun. 27, 2006), pp. 131-138.

Recchia et al., "Interfacial Passivation of Nanocoatings for Corrosion Inhibition of Magnesium Alloys," Recent Patents on Corrosion Science, vol. 2, 2012, pp. 48-60.

Tavandashti et al., "Corrosion protection evaluation of silica/epoxy hybrid nanocomposite coatings to AA2024," Progress in Organic Coatings, vol. 65, 2009, pp. 182-186.

Zheludkevich et al., "Nanostructured sol-gel coatings doped with cerium nitrate as pre-treatments for AA2024-T3 Corrosion protection performance," Electrochimica Acta, vol. 51, 2005 (Available online: May 17, 2005), pp. 208-217.

Zheng et al., "Inorganic-organic sol gel hybrid coatings for corrosion protection of metals," The Journal of Sol-Gel Science and Technology, vol. 54, vol. 20, 2010 (Published online: Feb. 25, 2010), pp. 174-187.

Chinese Office Action and Search Report dated Nov. 24, 2015, for Chinese Application No. 201210570516.0.

Jeong et al., "Preparation of Water-Repellent Glass by Sol-Gel Process Using Perfluoroalkylsilane and Tetraethoxysilane," Journal of Colloid and Interface Science, vol. 235, 2001, pp. 130-134.

Taiwan Office Action for Appl. No. 102149211 dated Mar. 12, 2015.

Innocenzi et al., "Structure and Properties of Sol-Gel Coatings from Methyltriethoxysilane and Tetraethoxysilane," Journal of Sol-Gel Science and Technology, vol. 3, 1994, pp. 47-55.

Mennig et al., "Sol-Gel derived thick coatings and their thermomechanical and optical properties," SPIE, Sol-Gel Optics II, vol. 1758, 1992, pp. 125-134.

Taiwan Office Action for Appl. No. 101148232 dated Aug. 27, 2014.

* cited by examiner

INORGANIC PASSIVATION MATERIAL, METHOD FOR FORMING THE SAME, AND INORGANIC PASSIVATION PROTECTIVE FILM PRODUCED THEREFROM

CROSS REFERENCE TO RELATED APPLICATIONS

This Application claims priority of Taiwan Patent Application No. 102149211, filed on Dec. 31, 2013, the entirety of which is incorporated by reference herein.

TECHNICAL FIELD

The disclosure relates to an inorganic passivation material, a method for forming the same, and an inorganic passivation protective film used on metal surface treatment.

BACKGROUND

Hexavalent chromium ($Cr6^+$) has been used in the surface passivation film of galvanized steel or aluminum alloy for a long time. According to the EU environmental directives of ROHS (The Restriction of Hazardous Substances in Electrical and Electronic Equipment) and WEEE (Waste Electronics and Electrical Equipment), United States, China, Japan and other countries started to limit the use of $Cr6^+$ in 2006 as well. So far, the popular alternative method is using organic-inorganic hybrid resins (O/I hybrid resins). However, the conventional O/I hybrid resins need a large amount of organic resin to maintain the film-forming ability, and then result in the insufficient weather resistance and heat resistance.

In addition, the passivation film requires not only good corrosion resistance, but also sufficient conductivity and heat resistance, due to the concern of anti-static or high temperature application. Besides, most of galvanized steels are currently used as casing materials in electronic products, such as refrigerators, ovens, computers, and washing machines. The requirement of environmental-friendly passivation treatment is indeed increasing.

SUMMARY

An embodiment of the disclosure provides a method for forming an inorganic passivation material. The method includes mixing about 5 to 80 parts by weight of tetraalkoxysilane, about 10 to 80 parts by weight of trialkoxysilane, and about 1 to 30 parts by weight of catalyst to perform a reaction at pH of 0.05 to 4 to form an inorganic resin material. The inorganic resin material is modified by phosphate ester to form an inorganic passivation material, wherein phosphate ester is about 0.1-10 parts by weight based on 100 parts by weight of the inorganic resin material.

Another embodiment of the disclosure provides an inorganic passivation material formed by the method described previously, and an inorganic content of the inorganic passivation material is at least 50 wt %.

Still another embodiment of the disclosure provides an inorganic passivation protective film formed by coating and curing the inorganic passivation material described previously, and the thickness of the inorganic passivation protective film is equal to or less than 20 µm, and the surface hardness of the inorganic passivation protective film is at least 2H.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims. For example, the formation of a first feature over and on a second feature in the description that follows may include embodiments in which the first and second features are formed in direct contact, and may also include embodiments in which additional features may be formed between the first and second features, such that the first and second features may not be in direct contact.

An embodiment of the present disclosure provides a method for forming an inorganic passivation material. In this method, tetraalkoxysilane, trialkoxysilane, and catalyst are used to perform a reaction (such as a sol-gel reaction) to form an inorganic resin material, and the ratio between the tetraalkoxysilane and trialkoxysilane and the pH value of the reaction may be adjusted to control the resulting inorganic resin material to have a desired linear portion and an appropriate degree of crosslinking. Thus, the resulting inorganic resin material may have both linear and network structures.

Figure 1:
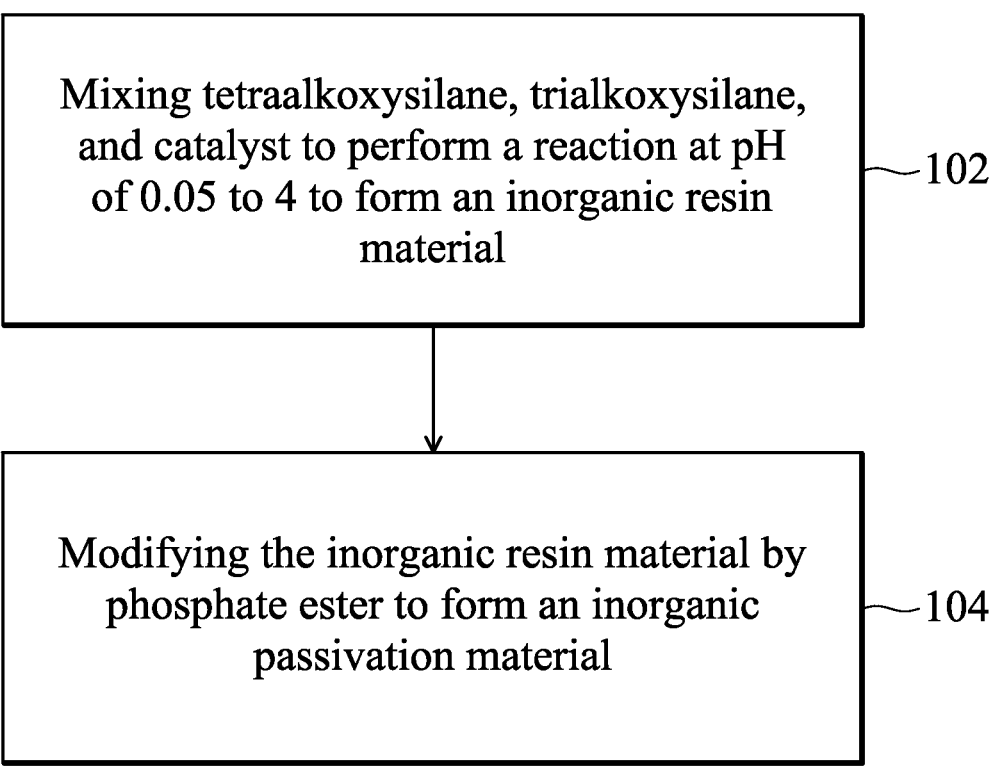
FIG. 1 illustrates a method for forming an inorganic passivation material according to an embodiment of the present disclosure.

FIG. 1 illustrates a method for forming an inorganic passivation material according an embodiment of the present disclosure. Referring to FIG. 1, in step 102, tetraalkoxysilane, trialkoxysilane, and catalyst are mixed to perform a reaction (such as a sol-gel reaction) to form an inorganic resin material. In step 104, the inorganic resin material obtained in step 102 is chemically modified by adding phosphate ester to form an inorganic passivation material, wherein phosphate ester may function as a surface passivation agent.

In the sol-gel reaction, the tetraalkoxysilane may have the following formula:

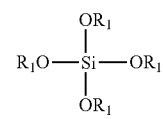

wherein each of $R_1$ is independently $C_1$ to $C_8$ straight-chain alkyl group. In addition, the trialkoxysilane may have the following formula:

$$R_3-\underset{\underset{OR_2}{|}}{\overset{\overset{OR_2}{|}}{Si}}-OR_2$$

wherein each of $R_2$ is independently $C_1$ to $C_8$ straight-chain alkyl group; $R_3$ is hydrogen, substituted or unsubstituted $C_1$ to $C_8$ alkyl group, substituted or unsubstituted $C_1$ to $C_8$ alkenyl group, epoxy group, or amino group. According to one embodiment, $R_3$ is substituted by such as fluorine.

Table 1 and Table 2 show some examples of suitable tetraalkoxysilane and trialkoxysilane. However, it is appreciated that these structures are merely illustration and the scope of the invention is not limited thereto.

TABLE 1

| | Tetraalkoxysilane |
|---|---|
| 1 | $H_3CH_2CO-\underset{\underset{OCH_2CH_3}{|}}{\overset{\overset{OCH_2CH_3}{|}}{Si}}-OCH_2CH_3$ |
| 2 | $H_3CH_2CH_2CO-\underset{\underset{OCH_2CH_2CH_3}{|}}{\overset{\overset{OCH_2CH_2CH_3}{|}}{Si}}-OCH_2CH_2CH_3$ |
| 3 | $H_3C(H_2C)_6H_2CO-\underset{\underset{OCH_2(CH_2)_6CH_3}{|}}{\overset{\overset{OCH_2(CH_2)_6CH_3}{|}}{Si}}-OCH_2(CH_2)_6CH_3$ |
| 4 | $H_3C(H_2C)_5H_2CO-\underset{\underset{OCH_2(CH_2)_5CH_3}{|}}{\overset{\overset{OCH_2(CH_2)_5CH_3}{|}}{Si}}-OCH_2(CH_2)_5CH_3$ |
| 5 | $H_3C(H_2C)_4H_2CO-\underset{\underset{OCH_2(CH_2)_4CH_3}{|}}{\overset{\overset{OCH_2(CH_2)_4CH_3}{|}}{Si}}-OCH_2(CH_2)_4CH_3$ |

TABLE 2

| | Trialkoxysilane |
|---|---|
| 6 | $H_3C-\underset{\underset{OCH_2CH_3}{|}}{\overset{\overset{OCH_2CH_3}{|}}{Si}}-OCH_2CH_3$ |
| 7 | $F_3C(F_2C)_5(H_2C)_2-\underset{\underset{OCH_2CH_3}{|}}{\overset{\overset{OCH_2CH_3}{|}}{Si}}-OCH_2CH_3$ |
| 8 | $H_3C-\underset{\underset{OCH_2(CH_2)_6CH_3}{|}}{\overset{\overset{OCH_2(CH_2)_6CH_3}{|}}{Si}}-OCH_2(CH_2)_6CH_3$ |

TABLE 2-continued

| | Trialkoxysilane |
|---|---|
| 9 | 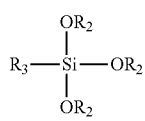 |
| 10 | $H_2C=\overset{H}{C}-\underset{\underset{OCH_2CH_3}{|}}{\overset{\overset{OCH_2CH_3}{|}}{Si}}-OCH_2CH_3$ |

Furthermore, examples of the catalyst used in the sol-gel reaction in step 102 of FIG. 1 may include hydrochloric acid, nitric acid, acetic acid, sulfuric acid, or a combination thereof. By using the catalyst, the sol-gel reaction may be performed under an acidic condition with a pH value of between 0.05 and 4, for example, between 1 and 3. The inorganic passivation material formed by the inorganic resin material made under such an acidic condition has a good hardness and adhesion properties. The result may be attributed to that inorganic resin material formed under acidic condition may easily have a linear structure.

It should be noted that, if the sol-gel reaction is performed under a basic condition, the resulting product will have a cluster structure since both polymerization and hydrolyzation occur simultaneously. Under a basic condition, the speed of polymerization becomes faster while the speed of hydrolyzation becomes slower. Thus, the reaction tends to form a core extending outward in four dimensions, resulting in the cluster structure. When the cluster structure is coated onto a film, the film may have a greater thickness due to powder-like, stacking effects. However, the film may have a poor hardness and adhesion properties (hardness less than 1H and fail to pass the 100/100 cross-cut test).

On the other hand, under an acidic condition, the speed of polymerization becomes slower while the speed of hydrolyzation becomes faster. Therefore, it tends to form a linear core first and then the remaining structures may extend from the linear core. Thus, a structure containing both a linear portion and a network portion can be formed. When forming a coating, the linear portion may prevent the coating from cracking, and the network portion may improve the density and the corrosion resistance. Therefore, the resulting material can have various applications.

In the present disclosure, the weight ratio between each reactant in the sol-gel reaction may be adjusted depending on the desired properties of the inorganic resin material. For example, in a sol-gel reaction, 5 to 80 parts by weight of tetraalkoxysilane, 10 to 80 parts by weight of trialkoxysilane, and 1 to 30 parts by weight of a catalyst may be used. According to another embodiment, 5 to 50 parts by weight of tetraalkoxysilane, 10 to 50 parts by weight of trialkoxysilane, and 1 to 15 parts by weight of a catalyst may be used in a sol-gel reaction. It is found that, the more the tetraalkoxysilane is used, the higher the crosslinking density, hardness and corrosion resistance of the inorganic resin material will be reached. However, as the amount of the tetraalkoxysilane increases, the coating also becomes brittle. Therefore, a suitable amount of the trialkoxysilane is needed to modify the material. However, if the amount of trialkoxysilane is too high, the crosslinking density of the inorganic resin material may be too low, resulting in poor physical properties, or even unable to form the film. Therefore, the ratio between each reactant may be adjusted depending on the required hardness. Furthermore, the inorganic resin material of the disclosure may have a high inorganic content such as more than 50 wt %, for example, between 50-99 wt %, and have good corrosion resistance and weather resistance.

The phosphate ester used in step 104 of FIG. 1 may include, for example, phosphatosilane, phosphatosiloxane, phosphate titanium alkoxide, sulfhydryl hydrocarbyl phosphate, or a combination thereof. Phosphate ester may be present in an amount of about 0.1 to 10 or 1 to 8 parts by weight based on 100 parts by weight of the inorganic resin material. The terminal silanol group and silane group of inorganic resin is chemically modified by siloxane group, silane group, titanium alkoxy, or thiol group of the phosphate ester described previously, such that the resulting inorganic passivation material may not only have good heat resistance and corrosion resistance, but also better weather resistance due to the high inorganic content of the inorganic resin material. It should be noted that, in the present disclosure, the surface passivation agent used in the inorganic passivation material does not include heavy metal salt, for example, chromate, molybdate, vanadate, or phosphate. In particular, the surface passivation agent is substantially free of $Cr^{6+}$. According to an embodiment, the $Cr^{6+}$ content of the resulting inorganic passivation material is ≤1 mg/kg, for example, ≤0.1 mg/kg.

The previously described phosphatosilane may include, for example,

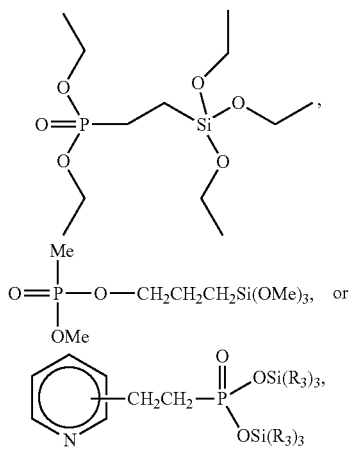

wherein each of $R_3$ is independently hydrogen, methyl, ethyl, propyl, or butyl.

The previously described phosphate titanium alkoxide may include, for example,

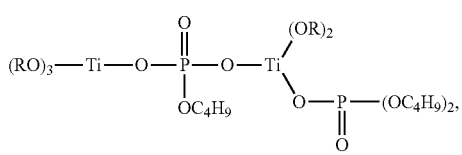

wherein each R is independently hydrogen, methyl, ethyl, propyl, butyl, or isopropyl.

The previously described sulfhydryl hydrocarbyl phosphate may include, for example,

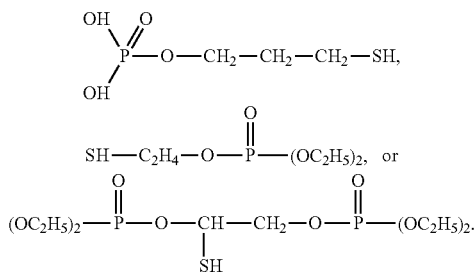

According to one embodiment, in step 104 of FIG. 1, the modification by phosphate ester is conducted in an organic solvent. In one embodiment, 0.01 to 80 parts by weight of an organic solvent may be added. Examples of the organic solvent may include methanol, ethanol, isopropanol, butanol, sec-butanol, isobutanol, tert-butanol or a combination thereof.

In addition, 0.0001 to 0.1 parts by weight of coalescent such as BYK®313 and BYK®346 or coating additive such as CYMEL®303, CYMEL®1158, or Desmodur BL®3175A may be added in the previously described coating to improve the film-forming rate in the subsequent process and comply with the requirement of a continuous process.

The inorganic content of the inorganic passivation material formed by the method of the present disclosure may be at least 50% (TGA char yield). For example, the inorganic content of the inorganic passivation material may be between 50 wt % and 80 wt % or between 50 wt % and 90 wt %. A weight average molecular weight of the inorganic resin material may be at least 1000 g/mol. For example, in some embodiments of the present disclosure, a weight average molecular weight of the inorganic resin material may be between about 1000 g/mol and 10000 g/mol.

Figure 2:
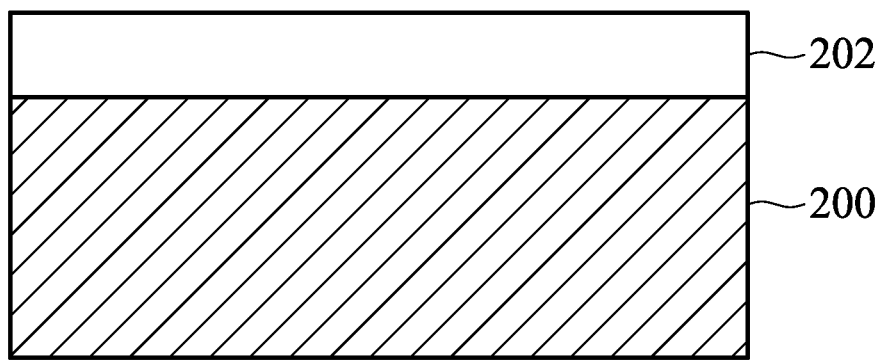
FIG. 2 illustrates an inorganic passivation protective film formed in an embodiment of the present disclosure.

In addition, an inorganic passivation protective film may be formed by coating and curing the inorganic passivation material, as shown in FIG. 2. FIG. 2 shows a cross section of an inorganic passivation protective film 202 formed by coating an inorganic passivation material onto the substrate 200 according to one embodiment. The substrate 200 may be any solid substrate, for example, rigid substrate, including metal, iron plate, steel plate, galvanizing steel, aluminum alloy, magnesium alloy, lithium alloy, semiconductor, glass, ceramics, silicon substrate, or for example, flexible substrate, including plastic substrate such as PES (polyethersulfone), PEN (polyethylenenaphthalate), PE (polyethylene), PI (polyimide), PVC (polyvinyl chloride), PET (polyethylene terephthalate), resin, or a combination thereof. Methods for coating the inorganic passivation material onto the substrate 200 may include, for example, spray coating, roll coating, dip coating, bar coating, spin coating, knife coating, brush coating, or a combination thereof. Then, the inorganic passivation material may be cured to form an inorganic passivation protective film 202 with a high surface hardness. The curing process may be performed at a temperature of 100-300° C., for example, 200° C., for 5-10 minutes. According to one embodiment, the surface hardness of the resulting inorganic passivation protective film is at least 2H, or even 4H.

It is noted that, passivation films used in surface treatment generally forms a metal complex oxide film by using inorganic salts to oxidize the metal surface to achieve purposes of passivation and anti-corrosion. However, it typically requires metal salt treatment solutions, for example, zinc phosphate, sodium nitrate, potassium dichromate, or other acidic treatment solutions. Moreover, since dip coating are often used, a large quantity of treatment solutions and soaking tanks are needed, resulting in increased cost of acidic wastewater treatment and the acidic vapor is also harmful to operators. Furthermore, due to a need of conductivity, this kind of inorganic salt anti-corrosion films, except for $Cr^{6+}$ films, have a thickness of less than about 3 μm, a poor corrosion resistance of only 48-96 hours, and a poor (unsatisfactory) hardness. In comparison, the inorganic passivation protective film of the present disclosure is modified by phosphate ester which may avoid the use of inorganic acid salts, and the resulting inorganic passivation protective film may have an ideal corrosion resistance and surface conductivity with a thickness of ≤20 μm or ≤10 μm. In one embodiment, the thickness of the inorganic passivation protective film may be about 1 to 2 μm, for example, 1 μm, which complies with the requirement (surface conductivity of ≤1 mΩ/sq) of steel plate used in electronic products.

In addition, if the pristine (non-modified) inorganic resin material of the present disclosure is coated and cured to form a film, the corrosion resistance only lasts for 72 hours. However, after being modified by phosphate ester, the resulting inorganic passivation protective film has improved passivation ability such as good adhesion property, heat resistance, and corrosion resistance. It is found that, in the natural environment of salt spray test, the time of producing 5% white rust on the metal surface is extended to more than 400 hours, that is the corrosion resistance is improved by more than five times.

It should be noted that, although organic polymer may improve film formation and flexibility, the resulting organic/inorganic hybrid material has an insufficient weather resistance and surface hardness. On the contrary, the inorganic passivation material of the disclosure can form a film, which has sufficient weather resistance and surface hardness, even without additional organic compounds, such as organic resins. The weight ratio between tetraalkoxysilane and trialkoxysilane and the pH value of the sol-gel reaction may be adjusted to control the degree of crosslinking and linearity to form an inorganic resin material having both linear and network structures. By the high inorganic content of inorganic resin material, the inorganic passivation protective film formed from the inorganic resin material may have an improved corrosion resistance (salt spray resistance ≥72 hours), heat resistance (no change in visual appearance after a heat treatment under 500° C. for 1 minute), and hardness (above 2H). In addition, the inorganic resin material may be modified by phosphate ester and cured to form an inorganic passivation protective film. The inorganic passivation protective film is free of heavy metal ion (such as hexavalent chromium) and has good corrosion resistance (salt spray resistance ≥400 hours), adhesion property and high density.

Examples 1

Tetraethyl orthosilicate (TEOS), methyltriethoxysilane (MTES), and 3-glycidoxypropyltrimethoxysilane (GPTMS) were mixed according to the ratio shown in Table 3. The mixture was stirred for 10 minutes at room temperature, and then, water and hydrochloric acid (0.1N) were added according to the ratio shown in Table 3. Next, a sol-gel reaction was performed for 16 hours at room temperature, then warmed up to 60° C. for additional 8 hours to form an inorganic resin material having both linear and network structures. Then, isopropanol (IPA) and TBEP (Titanium, Bu phosphate Et alc. Iso-Pr alc. Complexes) (CAS NO. 109037-78-7) were added to the mixture and thoroughly stirred for 16 hours at room temperature to form an inorganic passivation material.

Examples 2

The same process as in Example 1 was repeated, expect that TBEP was replaced by diethylphosphatoethyl triethoxy silane (PHS).

The resulting inorganic passivation materials in Examples 1-2 were further analyzed by thermal gravimetric analysis (TGA) by increasing the temperature to 800° C. to analyze the inorganic content (char yield) of the inorganic passivation materials. In addition, film-forming properties were evaluated after the coating was dried for 5 minutes. A drop of water was dripped to the specimen and the water was wiped off after 1 minute. If there was no change in visual appearance, it was marked ○ to represent that the coating was capable of forming film and completely dried.

The inorganic passivation materials were bar-coated onto a commercial blank hot dip galvanized steel (Yieh Phui Enterprise Co., Ltd., SGC-CZSWX Z-12) and dried at 200° C. for 5 minutes to form inorganic passivation protective films. The salt spray test was conducted according to Chinese National Standards 3627 (CNS 3627) to calculate the time of producing 5% white rust as results for anti-corrosion tests. The $Cr^{6+}$ was tested according to Chinese National Standards 15331 (CNS 15331). The intensity (cross-cut test) and pencil hardness of the surface were tested according to Chinese National Standards 10757 (CNS 10757). A heat treatment was conducted under 500° C. for 1 minute to test the heat resistance. It was marked ○ if there was no change in visual appearance. The test results are shown in Table 4.

As shown in Table 4, in Examples 1-2, the inorganic passivation material formed by mixing tetraethyl orthosilicate (TEOS), methyltriethoxysilane (MTES), 3-glycidoxypropyltrimethoxysilane (GPTMS) and hydrochloric acid according to the ratio shown in Table 3 had a char yield of more than 50%, a hardness of 4H, and was capable of forming film. It is found that, the inorganic passivation protective film formed in Example 1 has a salt spray resistance of 412 hours while the inorganic passivation protective film formed in Example 2 has a salt spray resistance of 288 hours according to the salt spray test. Moreover, there was no change in visual appearance of both of the inorganic passivation protective films. In addition, the $Cr^{6+}$ tests of Examples 1 and 2 are negative, representing that the $Cr^{6+}$ content of the coating was ≤1 mg/kg, which complies with the RoHS environmental requirement ($Cr^{6+}$ content of less than 1000 mg/kg). The pencil hardness of the inorganic passivation protective films was 4H.

Comparative Example 1

Tetraethyl orthosilicate (TEOS), methyltriethoxysilane (MTES), and 3-glycidoxypropyltrimethoxysilane (GPTMS) were mixed according to the ratio shown in Table 3. The mixture was stirred for 10 minutes at room temperature, and then, water and hydrochloric acid (0.1N) were added according to the ratio shown in Table 3. Next, a sol-gel reaction was performed for 16 hours at room temperature, and then warmed up to 60° C. for additional 8 hours to form an inorganic resin material having both linear and network structures. Then, isopropanol (IPA) and zinc phosphate were added to the inorganic resin material according to the ratio shown in Table 3 and then thoroughly stirred for 16 hours at room temperature. Since zinc phosphate was not compatible with other components, precipitation was formed and inorganic passivation material was not formed.

Comparative Examples 2-4

Comparative Examples 2-4 were, respectively, commercial blank hot dip galvanized steel (Yieh Phui Enterprise Co., Ltd.; SGC-CZSWX Z-12), commercial organic coating treated hot dip galvanized steel (Yieh Phui Enterprise Co., Ltd.; YP Standard SGCD3-ZSEX Z08), and commercial $Cr^{6+}$ passivation hot dip galvanized steel (Yieh Phui Enterprise Co., Ltd.; ZN-Coating Mass Z-12). Comparative Examples 2-4 were tested for their salt spray resistance, $Cr^{6+}$ content, hardness, heat resistance, and resistance value, and the results are shown in Table 4.

As shown in Table 4, Comparative Example 2 (commercial blank hot dip galvanized steel) has a salt spray resistance of less than 24 hours, a hardness of 1H, and became browning (oxidation) after a heat treatment under 500° C. for 1 minute. Comparative Example 3 (commercial organic hot dip galvanized steel) has a salt spray resistance of 120 hours, a hardness of <1H, and became yellowing (pyrolysis) after a heat treatment under 500° C. for 1 minute. Comparative Example 4 (commercial $Cr^{6+}$ passivation hot dip galvanized steel) has a salt spray resistance of 240 hours, a hardness of 4H; however, the $Cr^{6+}$ test was positive.

The present disclosure provides an inorganic passivation material with a high inorganic content, such that the resulting inorganic passivation protective film has a good corrosion resistance (salt resistance ≥72 hours), heat resistance (there is no change in appearance after a heat treatment under 500° C. for 1 minute), high hardness (at least 4H). In addition, the inorganic resin material is modified by phosphate ester and cured to form films, the resulting inorganic passivation protective film is free of heavy metal ion (such as $Cr^{6+}$), and has high corrosion resistance (salt spray resistance ≥400 hours), good adhesion property and high density.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

TABLE 3

| | TEOS (wt %) | MTES (wt %) | GPTMS (wt %) | water (wt %) | Hydrochloric acid (0.1N) (wt %) | Isopropanol (wt %) | TBEP (phr) | PHS (phr) | Zinc phosphate (phr) |
|---|---|---|---|---|---|---|---|---|---|
| Example 1 | 5.71 | 14.29 | 2.86 | 2.65 | 3.06 | 71.43 | 5 | | |
| Example 2 | 5.71 | 14.29 | 2.86 | 2.65 | 3.06 | 71.43 | | 5 | |
| Comparative Example 1 | 5.71 | 14.29 | 2.86 | 2.65 | 3.06 | 71.43 | | | 5 |
| Comparative Example 2 | Commercial blank hot dip galvanized steel | | | | | | | | |
| Comparative Example 3 | Commercial organic coating treated hot dip galvanized steel | | | | | | | | |
| Comparative Example 4 | Commercial $Cr^{6+}$ passivation hot dip galvanized steel | | | | | | | | | phr: based on 100 parts by weight of the mixture of TEOS, MTES, GPTMS, water, 0.1N hydrochloric acid, and isopropanol

TABLE 4

| | Salt spray resistance (5% white rust) | Char yield (wt %) | Weight average molecular weight (g/mol) | Film formation | $Cr^{6+}$ | Pencil hardness | Intensity | Heat resistance (500° C., 1 minute) | Resistance of film sheet (Ω/sq) |
|---|---|---|---|---|---|---|---|---|---|
| Example 1 | 412 hr | 56.22 | 7552 | ○ | negative | 4H | 100/100 | ○ (no change in visual appearance) | <1 mΩ/sq (Average thickness is about 1-2 μm) |
| Example 2 | 288 hr | 56.95 | 8120 | ○ | negative | 4H | 100/100 | ○ | <1 mΩ/sq (Average thickness is about 1-2 μm) |
| Comparative Example 1 | Zinc phosphate incompatible (precipitation) | | | | | | | | <1 mΩ/sq |
| Comparative Example 2 | <24 hr | — | — | — | negative | 1H | 100/100 | Oxidation (browning) | <1 mΩ/sq |
| Comparative Example 3 | 120 hr | — | — | — | negative | <1H | 100/100 | pyrolysis (yellowing) | <1 mΩ/sq (Average thickness is about 1-2 μm) |
| Comparative Example 4 | 240 hr | — | — | — | positive | 4H | 100/100 | ○ | <1 mΩ/sq (Average thickness is about 1-2 μm) |

What is claimed is:

1. A method for forming an inorganic passivation material, comprising:

mixing 5 to 80 parts by weight of tetraalkoxysilane, 10 to 80 parts by weight of trialkoxysilane, and 1 to 30 parts by weight of catalyst to perform a reaction at pH of 0.05 to 4, based on a total amount of the tetraalkoxysilane, the trialkoxysilane, and the catalyst, to form an inorganic resin material; and modifying the inorganic resin material by phosphate ester to form an inorganic passivation material, wherein phosphate ester is 0.1 to 10 parts by weight based on 100 parts by weight of the inorganic resin material, wherein the phosphate ester comprises phosphatosilane, phosphatosiloxane, phosphate titanium alkoxide, sulfhydryl hydrocarbyl phosphate, or a combination thereof, wherein the phosphatosilane comprises

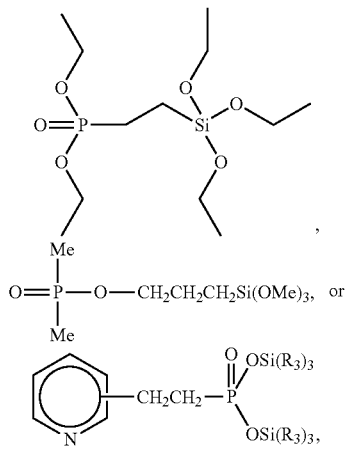

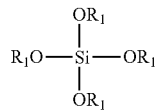

wherein each of $R_3$ is independently hydrogen, methyl, ethyl, propyl, or butyl.

2. The method for forming an inorganic passivation material as claimed in claim 1, further comprising coating and curing the inorganic passivation material to form an inorganic passivation protective film.

3. The method for forming an inorganic passivation material as claimed in claim 1, wherein the tetraalkoxysilane has the following formula:

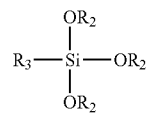

wherein each of $R_1$ is independently $C_1$ to $C_8$ straight-chain alkyl group.

4. The method for forming an inorganic passivation material as claimed in claim 1, wherein the trialkoxysilane has the following formula:

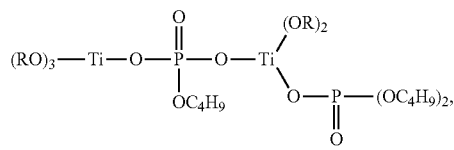

wherein each of $R_2$ is independently $C_1$ to $C_8$ straight-chain alkyl group; $R_3$ is hydrogen, substituted or unsubstituted $C_1$ to $C_8$ alkyl group, substituted or unsubstituted $C_1$ to $C_8$ alkenyl group, epoxy group, or amino group.

5. The method for forming an inorganic passivation material as claimed in claim 4, wherein $R_3$ is a functional group containing a fluorine substituent.

6. The method for forming an inorganic passivation material as claimed in claim 1, wherein the phosphate titanium alkoxide comprises

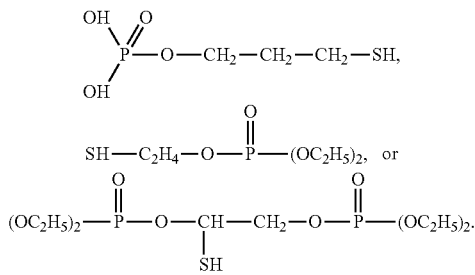

wherein each of R is independently hydrogen, methyl, ethyl, propyl, butyl, or isopropyl.

7. The method for forming an inorganic passivation material as claimed in claim 1, wherein the sulfhydryl hydrocarbyl phosphate comprises 8. The method for forming an inorganic passivation coating material as claimed in claim 1, wherein the catalyst comprises hydrochloric acid, nitric acid, acetic acid, sulfuric acid, or a combination thereof.

* * * * *